United States Patent [19]

Rosenquist

[11] Patent Number: 4,556,704

[45] Date of Patent: Dec. 3, 1985

[54] COMPOSITION

[75] Inventor: Niles R. Rosenquist, Evansville, Ind.

[73] Assignee: General Electric Company, Mt. Vernon, Ind.

[21] Appl. No.: 661,789

[22] Filed: Oct. 17, 1984

[51] Int. Cl.$^4$ .............................................. C08G 63/62
[52] U.S. Cl. ................... 528/196; 528/198; 528/199; 528/203
[58] Field of Search ............ 524/1; 528/199, 203, 528/198, 196

[56] References Cited

U.S. PATENT DOCUMENTS

| | | | |
|---|---|---|---|
| 3,028,365 | 4/1962 | Schnell et al. | 528/199 |
| 3,133,045 | 5/1964 | Deanin et al. | 528/199 |
| 3,251,806 | 5/1966 | Parker et al. | 528/203 |
| 3,275,601 | 9/1966 | Schnell et al. | 528/199 |
| 4,412,060 | 10/1983 | Rosenquist | 529/196 |
| 4,431,793 | 2/1984 | Rosenquist | 528/198 |
| 4,446,296 | 5/1984 | Rosenquist | 528/198 |
| 4,448,953 | 5/1984 | Rosenquist et al. | 528/198 |

Primary Examiner—Joseph L. Schofer
Assistant Examiner—N. Sarofim
Attorney, Agent, or Firm—Martin B. Barancik

[57] ABSTRACT

A composition comprising an end-capped aromatic carbonate polymer wherein the end-cap is of the structure

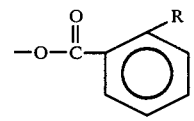

wherein R is

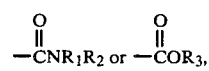

wherein $R_1$ and $R_2$ are the same or different and are alkyl of one to six carbon atoms, inclusive; cycloalkyl of four to seven carbon atoms, inclusive; phenyl; one to three alkyl substituted phenyl each alkyl having one to three carbon atoms, inclusive; and $R_1$ and $R_2$ taken together with the nitrogen to which they are attached form a ring of four to six carbon atoms; and wherein $R_3$ is alkyl of one to ten carbon atoms, inclusive; or cycloalkyl of four to eight carbon atoms, inclusive.

8 Claims, No Drawings

COMPOSITION

BACKGROUND OF THE INVENTION

Aromatic carbonate polymers have been end-capped with a variety of end-capping reagents. The most commonly employed family of compounds is the monophenols or related compounds.

A new class of end-capping compounds has now been discovered. This class of compounds can raise the secondary transition temperature, Tg, significantly over the unsubstituted phenol end-capper.

SUMMARY OF THE INVENTION

In accordance with the invention, there is a composition comprising an end-capped aromatic carbonate polymer wherein the end-cap is of the structure

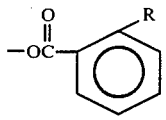

FIG. 1 wherein R is

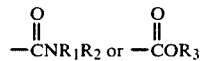

wherein $R_1$ and $R_2$ are the same or different and are alkyl of one to six carbon atoms, inclusive; cycloalkyl of four to seven carbon atoms, inclusive; phenyl; one to three alkyl substituted phenyl each alkyl having one to three carbon atoms, inclusive; and $R_1$ and $R_2$ taken together with the nitrogen to which they are attached form a ring of four to six carbon atoms; and wherein $R_3$ is alkyl of one to ten carbon atoms, inclusive; or cycloalkyl of four to eight carbon atoms, inclusive.

When $R_1$ and $R_2$ are both alkyl, it is preferred that at least one of them is a branched alkyl. It is more preferred that both $R_1$ and $R_2$ be branched alkyl when they are alkyl. When $R_3$ is alkyl, it is preferably branched.

DETAILED DESCRIPTION OF THE INVENTION

The end-capped polycarbonates of this invention are prepared utilizing standard reaction procedures and conditions. Generally a dihydric phenol and a carbonate precursor as well as the end-capping agent are used in the preparation of the polycarbonate. The dihydric phenols employed in the preparation are those typically used and illustratively exemplified below
2,2-bis(4-hydroxyphenyl)propane;
bis(4-hydroxyphenyl)methane;
2,2-bis(4-hydroxy-3-methylphenyl)propane;
4,4-bis(4-hydroxyphenyl)heptane;
2,2-(3,5,3'-5'-tetrachloro-4,4'-dihydroxylphenyl)propane;
2,2-(3,5,3',5'-tetrabromo-4,4'-dihydroxydiphenyl)propane;
(3,3'-dichloro-4,4'-dihydroxyphenyl)methane.

Other dihydric phenols which are also suitable for use in the preparation of the above polycarbonates are disclosed in U.S. Pat. Nos. 2,999,835; 3,028,365; 3,334,154 and 4,131,575.

The carbonate precursors are the usual ones, phosgene preferred, as set out in U.S. Pat. Nos. 4,018,750 and 4,123,436, interfacial process or those used in transesterification processes as in U.S. Pat. No. 3,153,008.

In preparing copolyestercarbonates with the end-capping agent of this invention, the procedures of U.S. Pat. No. 4,238,596 can be followed. The ester precursor can be aromatic diacids such as isophthalic acid or terephthalic acid or preferably their diacid chlorides. It is preferable to use a mixture of the iso and tere diacid chlorides, the isophthaloyl chloride being present in from about 10 to 97 percent of the mixture. Generally copolyestercarbonates having from about 25 to about 90 mole percent ester linkages are preferred.

The end-capping agent of this invention

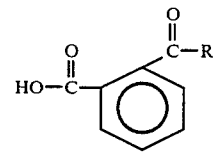

FIG. 2

R as previously defined, is readily prepared either by reacting phthalic anhydride with the appropriate amine at an elevated temperature in the presence of a slight molar excess of a trialkylamine such as triethylamine followed by aqueous acid workup or by reacting phthalic anhydride with an appropriate alcohol.

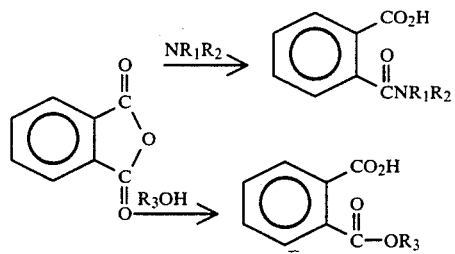

FIG. 3

The temperature employed for the alcohol reaction should be from about 100° to about 150° C. for about 30 minutes to about 2 hours. The temperature used for the amine reaction can vary from about 110° to 175° C. Reaction time is not critical and can vary from about 8 to 24 hours.

The end-capping agent of this invention need not be the sole end-capping agent for the aromatic carbonate polymer. Other end-capping agents may also be present such as, for example, phenol. In a similar manner more than one dihydric phenol can be also present in the aromatic carbonate polymer. The preferred dihydric phenol is bisphenol-A.

Below are examples of the invention. These examples are intended to exemplify the broad nature of the invention rather than narrow it.

EXAMPLE 1

A. Preparation of amide substituted benzoic acid wherein $R_1$ and $R_2$ are both phenyl[2-(diphenylaminoformyl)benzoic acid].

74.1 g (0.5 mole) phthalic anhydride and 84.6 g (0.5 mole) diphenyl amine were mixed in a 500 ml round bottom flask with a stir bar and condenser. The flask was heated to about 90° C. To it was then added 66 g of triethylamine (dried over 4 A° molecular sieves). The flask was heated to about 112° C. with stirring for 5 hours, then at 100° C. for an additional 16 hours. The reaction was complete at that time as judged by its infrared spectrum.

The reaction mix was diluted with 300 ml water to give a dark brown clear solution. 60 ml concentrated HCl was added in portions to give a pH<1. A paste-like precipitate formed. The aqueous layer was decanted from the precipitate and the precipitate was then washed twice with 1000 ml portions of water. The solid was then dissolved in 500 ml acetone. Dilution of this acetone solution with water to a total final volume of 2250 ml yielded the product as a fine solid precipitate which was collected by vacuum filtration, dried and recrystallized from methanol. Infrared spectrum: 1685 cm$^{-1}$, 1655 cm$^{-1}$, 1590 cm$^{-1}$ and 1575 cm$^{-1}$.

B. Preparation of 2-(diphenylaminoformyl)benzoic acid end-capped bisphenol-A polycarbonate.

A 1000 ml four neck flask was fitted with a mechanical stirrer, a pH probe, aqueous caustic inlet tube and a Claisen adaptor to which was attached a dry ice condenser and a gas inlet tube. To the flask was added 280 ml water, 340 ml methylene chloride, 1.4 ml triethyl amine (0.01 mole) and 57 g (0.25 mole) bisphenol-A. With stirring the pH was raised to 8.5 by addition of 25% aqueous sodium hydroxide, then 3.23 gms (0.00925 mole, 3.7 mole %) of the 2-(diphenylaminoformyl)benzoic acid was added, then phosgene was introduced into the flask at 0.5 g/min. for 60 minutes (0.3 mole) with pH maintained at 8.5 to 9.5. The resin layer was separated from the brine layer, then washed twice with 3 wt. % aqueous HCl, then twice with distilled water. The resin was then precipitated into 1500 ml of methanol in a Waring blender, then washed with 500 ml more methanol.

C. The procedure of Example 1B was repeated except that 3.3 mole % of the 2-(diphenylaminoformyl)-benzoic acid was employed.

Below are the data:

| SAMPLE | MOLE % END-CAP | INTRINSIC VISCOSITY 25° C. in Me$_2$Cl$_2$ | Tg °C. |
| --- | --- | --- | --- |
| 1B | 3.7 | 0.407 | 151.6° C. |
| 1C | 3.3 | 0.485 | 155° C. |

For comparison purposes the procedure of Example 1B and 1C was repeated except that phenol was used as the end-capping agent. At an I.V. of 0.491, a Tg of 150.3° C. was achieved.

What is claimed is:

1. A composition comprising an end-capped aromatic carbonate polymer wherein the end-cap is of the structure

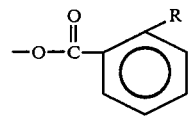

wherein R is

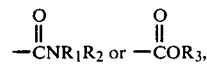

wherein $R_1$ and $R_2$ are the same or different and are alkyl of one to six carbon atoms, inclusive; cycloalkyl of four to seven carbon atoms, inclusive; phenyl; one to three alkyl substituted phenyl each alkyl having one to three carbon atoms, inclusive; or $R_1$ and $R_2$ taken together with the nitrogen to which they are attached form a ring of four to six carbon atoms; and wherein $R_3$ is alkyl of one to ten carbon atoms, inclusive; or cycloalkyl of four to eight carbon atoms, inclusive.

2. The composition in accordance with claim 1 wherein

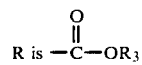

3. The composition in accordance with claim 1 wherein R is

4. The composition in accordance with claim 3 wherein $R_1$ and $R_2$ are phenyl.

5. The composition in accordance with claim 3 wherein $R_1$ is phenyl.

6. The composition in accordance with claim 3 wherein $R_1$ is branched alkyl of three to six carbon atoms, inclusive.

7. The composition in accordance with claim 3 wherein $R_1$ is cycloalkyl of four to seven carbon atoms, inclusive.

8. The composition in accordance with claim 2 wherein $R_3$ is branched alkyl of four to ten carbon atoms, inclusive, or cycloalkyl of four to eight carbon atoms, inclusive.

* * * * *